E. N. HURLBURT.
METASTATIC THERMOMETER.
APPLICATION FILED SEPT. 21, 1916.
1,350,158.
Patented Aug. 17, 1920.
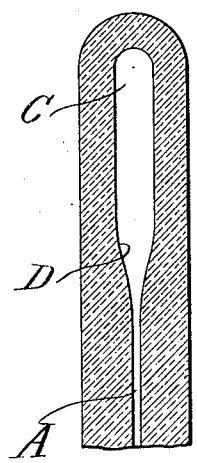
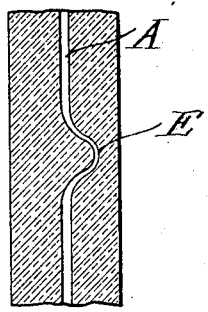
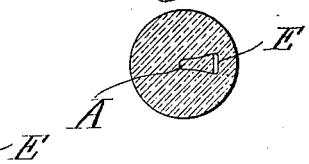
WITNESSES:
Nelson H. Copp
INVENTOR
Edward N. Hurlburt
BY
his ATTORNEYS

UNITED STATES PATENT OFFICE.

EDWARD N. HURLBURT, OF ROCHESTER, NEW YORK, ASSIGNOR TO TAYLOR INSTRUMENT COMPANIES, OF ROCHESTER, NEW YORK, A CORPORATION OF NEW YORK.

METASTATIC THERMOMETER.

1,350,158.  Specification of Letters Patent.  Patented Aug. 17, 1920.

Application filed September 21, 1916. Serial No. 121,384.

*To all whom it may concern:*

Be it known that I, EDWARD N. HURLBURT, of Rochester, in the county of Monroe and State of New York, have invented certain new and useful Improvements in Metastatic Thermometers; and I do hereby declare the following to be a full, clear, and exact description of the same, reference being had to the accompanying drawings, forming a part of this specification, and to the reference characters marked thereon.

My invention has for its purpose to provide a novel and improved form of metastatic thermometer by which is meant a differential thermometer, or one primarily adapted for sensitively indicating slight changes from a given temperature rather than absolute temperatures expressed in degrees above a standard zero. Such a thermometer may be employed for very accurate measurements of slight temperature changes, embodying generally a graduated scale indicating small parts of a degree and covering a range of six degrees centigrade, for instance, and which can be utilized to accurately indicate a very slight change of temperature at any point of the centigrade scale. In a more specific aspect, the invention resides in affording a structure that can be manufactured at a reasonable cost, and in a way that makes the device commercially practical from the standpoint of simplicity of operation, durability and resistance against breakage. To these and other ends the invention consists in certain improvements and combination of parts, all as will be hereinafter more fully described, the novel features being pointed out in the claims at the end of the specification.

In the drawings:

Figure 1 is a side view of a thermometer constructed in accordance with a preferred embodiment of my invention, and showing the heat expansive liquid column continuous throughout the tube;

Fig. 2 is a similar view, illustrating the column of heat expansive liquid after it is broken or separated at a designated portion of the tube, and with the surplus liquid contained in the supplemental reservoir at one end of the tube;

Fig. 3 is an enlarged sectional view of the supplemental reservoir at one end of the tube;

Fig. 4 is an enlarged view in vertical section of the portion of the tube when the shape of the bore is changed, and Fig. 5 is an enlarged view in horizontal section of the same.

Similar reference characters in the several figures indicate the same parts.

In its broad aspect, the invention comprises a tube having a bulb at one end containing suitable heat expansive liquid, such as mercury, and a supplemental reservoir at the opposite end for receiving the surplus liquid, that is to say, the amount over and above what is required in making each individual test or reading at any given temperature, as will be explained more fully presently. The principal part of the bore of the tube is rounded in cross section as usual, but at one part its section is so changed that while it has approximately the same carrying capacity or area the mercury column is rendered more readily frangible. In the present embodiment this is accomplished by flattening the bore affording a wide and comparatively thin passage through which the fluid may pass from one part of the tube to the other in both directions. The nature of the flattened portion is such that free passage of the fluid is permitted in either direction, and when the tube is held in a generally horizontal position or inclined with the bulb end uppermost, the column of liquid is broken or separated by reason of the fact that the film at the flattened portion is so attenuated that it is not sufficient to maintain a connection between the adjacent parts of the column, which is thereby separated, permitting the surplus liquid or that part on the opposite side of the separation from the bulb to flow into the supplemental reservoir at the end of the tube. The portion of the liquid column between the bulb and the flattened portion is then ready to be subjected to the temperature of the body in which the test or reading is to be made. The supplemental reservoir for the surplus liquid is so constructed and arranged relative to the liquid column as to retain the latter, and prevent it from freely running back into the main body of the tube as hereinafter described.

In the illustrated embodiment, which it will be understood is shown merely by way of example, A designates a tube having the bulb B at one end and the supplemental reservoir C at its opposite end for receiving the surplusage of the heat expansive liquid. The supplemental reservoir C is connected with the tube A by a comparatively long and gradually tapering passage D the sides of which are convex in longitudinal section between the entrance of the bore and the maximum diameter of the reservoir, as shown, which serves to hold the surplus liquid within the reservoir, while the main body is used in making the reading. Between the ends of the tube there is provided a portion, designated by E, formed preferably by flattening the walls of the circular bore to provide a wide, thin passage through which the liquid can pass freely from one portion of the tube to the other. While the opening at the portion E is of sufficient thickness to permit the fluid to pass readily from one part of the tube to the other, it is also of such thinness as to spread the liquid into a very thin film, having insufficient strength to maintain itself when the tube is held in a position generally horizontal or inclined to the vertical, with the bulb end uppermost. I prefer to use the term "generally horizontal" because, in some instances, due to unappreciable differences in the diameter of the bore, the column will break when the instrument is in horizontal position, and in others a slight elevation of the bulb is required. A finely graduated scale F is provided exteriorly of the tube and arranged preferably between the portion E and the reservoir C. The scale may be of different lengths and of different graduations, and in the construction shown, embodies a range of six degrees centigrade, divided into hundredths of a degree. The zero mark of the scale is located at a known distance from the constriction E, which, in the present instance is, preferably, the space corresponding to one degree on the scale, but of course this distance may be varied to suit convenience, as will be apparent.

The operation of the thermometer briefly is as follows: The bulb is heated to cause the main body of liquid to rise in the tube until it meets the surplus liquid in the supplemental reservoir, forming a continuous liquid column. Assuming that a reading is to be taken of a rise from twenty degrees centigrade, the bulb is placed in a bath maintained at a temperature of nineteen degrees centigrade, or such other temperature less than twenty degrees as is determined by the space between the zero of the scale and the constriction E, as determined by a secend thermometer, and is held there until the fluid column comes to rest. The metastatic thermometer is then removed from the bath and held in a generally horizontal position, or inclined, with its bulb end uppermost, which causes the liquid column to break or separate at the portion E, and the liquid contained between this portion and the supplemental reservoir immediately flows into the latter and in the present construction is retained there through capillary action. The thermometer is then placed in the bath upon which the test is to be made, and the main body of liquid rises above the portion E to a point somewhere along the graduated scale, so that a reading can be had for any rise within a range of say six degrees above the starting point of twenty degrees centigrade.

The invention is not to be confined in any sense to the precise arrangement shown, and the application is intended to cover any modifications embodying the underlying idea of a tube having a bulb at one end and a supplemental liquid reservoir at the opposite end, combined with a portion so formed that, while it will permit the main body of liquid to pass freely in either direction, also permits it to be readily broken or separated to set the thermometer at any given temperature, this in the present embodiment being caused by varying the shape of the bore while maintaining approximately the same cross sectional area, as by flattening it. The portion of the bore of the tube which is modified or changed may be located either above or below the scale, and it may be made in other ways without departing from the intent or scope of my invention.

Thermometers such as shown herein, are particularly adapted for use as electrical contact indicating thermometers in which the metallic contacts are fused in the glass inasmuch as they may be accurately set or regulated to vary the electrical indicating circuit at any given temperature in a very fine degree and with a single thermometer different temperatures may be indicated.

I claim as my invention:

1. A metastatic thermometer comprising a tube containing heat expansive liquid and having a portion of its bore modified in form without material variation of its cross sectional area to permit the liquid to pass freely in either direction when held in a vertical position and to cause the liquid column to break or separate when the tube is placed in a generally horizontal position, a supplemental reservoir for surplus liquid at one end of the tube communicating with the bore, a graduated scale for the tube, and a bulb at the opposite end of the latter communicating with the bore.

2. A metastatic thermometer comprising a tube containing heat expansive liquid and having a portion forming a wide thin opening adapted to permit free passage of the liquid when held in a vertical position but adapted to spread the liquid into a thin film that readily separates or breaks when the tube is in a generally horizontal position, a supplemental reservoir for surplus liquid at one end of the tube, a bulb at the opposite end of the tube, and a graduated scale on the tube.

3. A metastatic thermometer comprising a tube containing heat expansive liquid and having a constricted portion forming a wide thin opening adapted to permit free passage of the liquid when held in a vertical position but adapted to attenuate the liquid into a thin film that readily separates or breaks when the tube is in a generally horizontal position, a supplemental reservoir for surplus liquid at one end of the tube communicating with the bore, a graduated scale between the constricted portion and the reservoir, and a bulb at the opposite end of the tube communicating with the bore.

4. A metastatic thermometer comprising a tube containing heat expansive liquid and having a portion of its bore modified in form without material variation of its cross sectional area to permit the liquid to pass freely in either direction when held in a vertical position and to cause the liquid column to break or separate when the tube is placed in a generally horizontal position, a supplemental reservoir for surplus liquid at one end of the tube communicating with the bore by a passage adapted to frictionally restrict the flow of liquid from said reservoir except when united by expansion with the liquid in the bore, a graduated scale for the tube, and a bulb at the opposite end of the latter communicating with the bore.

EDWARD N. HURLBURT.